(12) United States Patent
Samuelsson

(10) Patent No.: US 7,653,395 B2
(45) Date of Patent: Jan. 26, 2010

(54) COMPUTER IMPLEMENTED METHODS AND COMPUTER PROGRAM PRODUCTS FOR EVALUATING RADIO COMMUNICATIONS SYSTEMS

(75) Inventor: Joachim Samuelsson, Vienna (AT)

(73) Assignee: Actix Limited (GB)

( * ) Notice: Subject to any disclaimer, the term of this patent is extended or adjusted under 35 U.S.C. 154(b) by 765 days.

(21) Appl. No.: 11/258,585

(22) Filed: Nov. 29, 2005

(65) Prior Publication Data

US 2006/0141947 A1 Jun. 29, 2006

Related U.S. Application Data

(63) Continuation of application No. PCT/SE2004/000099, filed on Feb. 6, 2004.

(60) Provisional application No. 60/445,427, filed on Feb. 7, 2003.

(30) Foreign Application Priority Data

Feb. 7, 2003 (SE) .................................. 0300360

(51) Int. Cl.
*H04W 40/00* (2009.01)
(52) U.S. Cl. .......................................... 455/446; 455/447
(58) Field of Classification Search ........................ None
See application file for complete search history.

(56) References Cited

U.S. PATENT DOCUMENTS

| | | | |
|---|---|---|---|
| 4,768,187 A * | 8/1988 | Marshall .................... 370/343 |
| 4,850,036 A * | 7/1989 | Smith ........................ 455/502 |
| 5,839,074 A | 11/1998 | Plehn | |
| 5,987,305 A * | 11/1999 | Reitberger ................... 455/62 |
| 6,175,734 B1 * | 1/2001 | Desgagne et al. ........... 455/437 |
| 6,252,910 B1 * | 6/2001 | West et al. ................... 375/261 |
| 6,405,043 B1 | 6/2002 | Jensen et al. | |
| 6,480,718 B1 | 11/2002 | Tse | |
| 6,487,414 B1 | 11/2002 | Tanay et al. | |
| 6,490,262 B1 * | 12/2002 | Hogger ....................... 370/337 |
| 6,859,486 B1 * | 2/2005 | Mohebbi ..................... 375/132 |
| 2003/0021245 A1 * | 1/2003 | Haumonte et al. .......... 370/330 |

FOREIGN PATENT DOCUMENTS

| WO | WO-94/01760 A1 | 1/1994 |
|---|---|---|
| WO | WO-2004084571 A1 | 9/2004 |

OTHER PUBLICATIONS

"International Search Report for corresponding PCT Application No. PCT/SE2004/000099", (May 4, 2004), 3 pgs.

* cited by examiner

*Primary Examiner*—Ajit Patel
(74) *Attorney, Agent, or Firm*—Schwegman, Lundberg & Woessner, P.A.

(57) ABSTRACT

A computer implemented method is disclosed, for modeling a frequency assignment for a radio communications system, comprising a plurality of radio transmitters. The method comprises assigning a frequency to one of said plurality of radio transmitters based on a probability of said radio transmitter being assigned a predetermined frequency. Also disclosed are computer implemented methods and computer program products for determining frequency usage probabilities, frequency reuse, expected signal strengths, quality-of-service and station relationships in connection with cell, capacity and frequency planning procedures.

39 Claims, 8 Drawing Sheets

COMPUTER IMPLEMENTED METHODS AND COMPUTER PROGRAM PRODUCTS FOR EVALUATING RADIO COMMUNICATIONS SYSTEMS

This application is a continuation under 35 U.S.C. 111(a) of PCT/SE2004/000099, filed Feb. 6, 2004 and published as WO 2004/084571 A1, on Sep. 30, 2004, which claimed priority under 35 U.S.C. 119 to Sweden Application No. 0300360-5, filed Feb. 7, 2003 and U.S. Provisional Application Ser. No. 60/445,427, filed Feb. 7, 2003, which applications and publication are incorporated herein by reference and made apart hereof.

FIELD OF THE INVENTION

The present invention relates to radio communications systems, and more specifically to computer implemented methods and computer program products for modeling frequency assignments, frequency usage and frequency reuse in connection with evaluation of radio communications systems.

BACKGROUND OF THE INVENTION

The network infrastructure of a known radio communications system, e.g. a system for cellular or telephony, includes a plurality of fixed, spaced-apart radio base stations (referred to as "stations"), each of which transmits signals to and receives signals from a plurality of mobile users, within its geographic coverage area.

FIG. 1 illustrates a network infrastructure of a typical radio communications system, comprising radio base stations R0, R1, R2, R3, R4. The system in FIG. 1 schematically illustrates a mobile unit U, such as a cellular telephone handset, which is served by a serving station R0. Each of the radio base stations R0, R1, R2, R3, R4 is associated with a respective operating range L0, L1, L2, L3, L4, which indicates an area in which the radio base station is capable of communicating with mobile units. As is clear from FIG. 1, the operating ranges may overlap within certain geographical areas. For example, in FIG. 1, the operating range of station R1 partially overlaps with the operating ranges of stations R0, R2 and R3, but not with station R4.

Each station may have a plurality of radio transmitters that communicate with mobile users over either a single frequency or, in the case of a synthesized frequency hopping radio transmitter, a plurality of frequencies. Because the plurality of stations are positioned at given intervals throughout the geographic area, communication signals, both downlink signals generated by a station and uplink signals generated by a mobile user, need only be of relatively low power levels for the base station and mobile user to effectively communicate with each other.

A significant advantage inherent in radio communications systems is the ability to reuse the available frequencies. A spectrum of available frequencies is typically assigned to a radio network operator of a radio communications system by a controlling authority. In a case where a number of radio network operators are to operate similar systems using similar equipment, there may be only a relatively narrow range of frequencies, which is to be distributed between the operators. Thus, each radio network operator need to utilize its available frequencies as efficiently as possible.

The relatively low power levels of the communication signals, allow the same frequencies to be allocated for communications in different stations within the radio communications system. Thus, the same frequency can be used concurrently at a plurality of locations throughout the geographical area of the radio communications system, which permits a plurality of different communications between a plurality of different mobile users to be carried out at the same frequency at any given time. For example, in FIG. 1 the stations R1 and R4 could be assigned the same frequencies, since their respective operating ranges L1, L4 do not overlap.

The stations whose communications are activated at the same frequencies must be carefully selected so that concurrent reuse of communication signals in the various stations do not interfere significantly with one another. If frequencies are reused at locations that are too close to one another, interference between the signals transmitted on the same frequencies might result.

In order to optimize the performance of radio communications systems it is important to predict accurately how the reuse of frequencies impacts the quality-of-service in the network.

Quality-of-service may be expressed in terms of a carrier-to-interference ratio between the signal strength from a serving station and the compound of signal strengths from one or many interfering stations, or by mapping this carrier-to-interference ratio to a probability of interference. Typically, the quality-of-service is specific to each physical location within the geographic area served by the radio communications network.

It is known, from e.g. Halonen, T. et al.: *GSM, GPRS and EDGE Performance-Evolution Towards 3G/UMTS*, John Wiley & Sons, Ltd., 2002, page 575, to predict quality-of-service by deriving carrier-to-interference ratios for a carrier frequency k where a plurality of interfering signals $I_{jk}$ are received from a plurality of interfering stations j, by a signal strength comparison between a carrier signal at the carrier frequency k and the compound of all interfering signals $I_{jk}$ at this same k frequency and adjacent frequencies k±1. The interfering signals at adjacent frequencies are considered after attenuation by a factor that reflects the level of interference at a frequency from an adjacent frequency in the technology of the present radio communications system. By an "adjacent frequency" is meant any frequency, other than the predetermined frequency, which is capable of interfering with e.g. the carrier frequency. This could be expressed by the following formula:

$$CIR_k = C_k / (\Sigma_j (I_{jk} + adj^*(I_{j,k-1} + I_{j,k+1})) + N_0) \quad (1),$$

wherein:

$CIR_k$ is the carrier-to-interference ratio at carrier frequency k;

$C_k$ is the serving signal strength at carrier frequency k;

$\Sigma_j I_{jk}$ is the sum of all signal strengths from interfering stations j at frequency k;

adj is the adjacent frequency protection on the first adjacent carrier frequency; and $N_0$ is the receiver noise floor.

U.S. Pat. No. 6,405,043 B1 discloses a method of deriving the interference at a carrier frequency with consideration of transmission probabilities of the stations, where the frequency assignments have been allocated. However, the method described in U.S. Pat. No. 6,405,043 B1 is not applicable in a situation when frequency assignments have not been allocated.

It is also known from e.g. Snyman, M.: *The Challenges of Obtaining an Accurate Model of your Network for Input to AFP Tools*, Optimizing GSM Networks, Conference Proceedings, IIR ltd., 1999, page 2 ff, to predict quality-ofservice at carrier frequency by mapping the carrier-to-interference ratio to a probability of interference using a CIR-weights function, ciw ($CIR_k$).

FIG. 2 provides an example of a known CIR-weights function for mapping from carrier-to-interference ratio to probability of interference. The ciw-function of FIG. 2 provides a mapping of a carrier-to-interference ratio in dB (x-axis) to a probability of interference (y-axis). The figure indicates the probability of interference in case of reuse on the same frequency (co-curve—right curve) and adjacent frequency (adj-curve—left curve).

There are several procedures that use quality-of-service predictions in the design and optimization of a radio communications system, such as a mobile network.

Cell planning procedures are used to optimize the quality-of-service by configuring the stations in the radio communications system.

Capacity planning procedures aim at predicting the quality-of-service for a given level of capacity growth, or at determining a possible capacity growth before the quality-of-service is degraded to a predetermined minimum value.

Frequency planning procedures are used to optimize quality-of-service by efficiently assigning the frequencies that are available to the radio network operator.

In cell planning procedures, the frequency assignments of the stations have typically not yet been allocated. Instead stations, each serving a particular geographic area, referred to as a cell, are typically placed and configured without any consideration of the frequency assignments. The rationale behind this is that the frequency parameters are relatively easy to change in radio communications systems and are therefore assigned after the stations have been placed and configured. Thus, a frequency planning procedure will have to take place subsequent to the cell planning procedure. The configurations of the stations within the radio communications system will therefore be unbiased in terms of their frequency assignments.

With additional mobile users added to the radio communications system, it is required that additional radio transmitters and thereby frequencies are allocated to the stations. In capacity planning procedures, when e.g. additional capacity in terms of new stations and/or radio transmitter are added to an existing system, such stations and/or radio transmitters need to be assigned frequencies. However, to accommodate these new frequency requirements it is typically necessary to reallocate the frequency assignments of all radio transmitters in the area, subject to this capacity growth in order to ensure a good overall frequency plan in this area.

Frequency planning procedures aim at allocating frequencies optimally in radio communications systems. This is typically an iterative process, wherein frequencies are manually assigned, evaluated and then reassigned, depending on the outcome. In this process, station relationships are used as indications of how communications are impacted in case any pair of two stations reuses either the same or adjacent frequencies. This impact is expressed either as the amount of traffic (Erlangs) or as the amount of area (square kilometers or square miles) that would be interfered if the two stations reused. Note that the frequency assignments of the stations have not yet been allocated when the station relationships are derived. The calculation is solely based on the assumption that the serving and interfering station are reusing frequencies, without specifying which specific frequencies they are reusing. An algorithm is known for deriving these station relationships by aggregating over all locations the mapping of signal strength comparisons between pairs of a serving station and a single interfering station to interference probabilities.

This known algorithm is outlined below with reference being made to FIG. 3.

In step S0, traffic ($tic_{ij}$, $tia_{ij}$) and area ($aic_{ij}$, $aia_{ij}$) accumulators are initially set to zero. These accumulators identify the amount of traffic/area that would be interfered if a serving station i and an interfering station j reuse either the same frequency or adjacent frequencies.

In step S1, a location is selected for evaluation.

Step S2 constitutes a sub-step of step S1, which comprises identifying and evaluating a serving station i at this location, with the probability of serving at this location equal to $sp_i$.

Step S3 is a sub-step of step S2, and comprises evaluating each station j which interferes with the serving station i at this location.

In step S4, lpc, the probability of interference at the location assuming reuse with station j on the same frequency is calculated: lpc=$sp_i$*(ciw($C_i/I_j$)).

In step S5, lpa, the probability of interference at the location assuming reuse with station j on adjacent frequencies is calculated: lpa=$sp_i$*(ciw($C_i/I_j$–adj)).

In step S6, the amount of traffic that would be interfered at this location on the same frequency, $tic_{ij}$, and on adjacent frequencies, $tia_{ij}$, is added to the traffic accumulators:

$$tic_{ij}=tic_{ij}+lpc*lt;\ tia_{ij}=tia_{ij}+lpa*lt.$$

In step S7, the amount of area that would be interfered at this location on the same frequency, $tic_{ij}$, and on adjacent frequencies, $tia_{ij}$, is added to the area accumulators:

$$aic_{ij}=aic_{ij}+lpc*la;\ aia_{ij}=aia_{ij}+lpa*la.$$

In step S8, the flow returns to step S3 in case there are more interfering stations at the present location.

In step S9, the flow returns to step S2 in case there are more serving stations at the present location.

In step S10, the flow returns to step S1 in case there are more locations to evaluate.

In step S11, the flow terminates, with the traffic ($tic_{ij}$, $tia_{ij}$) and area ($aic_{ij}$, $aia_{ij}$) accumulators as the derived result between all combinations of a serving station i and an interfering station j.

In the above described algorithm, the following abbreviations are used:

$tic_{ij}$ designates traffic interfered if station i reuse with station j on the same frequency, $tia_{ij}$ designates traffic interfered if station i reuse with station j on adjacent frequencies, $aic_{ij}$ designates area interfered if station i reuse with station j on the same frequency, $aia_{ij}$ designates area interfered if station i reuse with station j on adjacent frequencies, $C_i$ expresses the signal strength of serving station i at the location in dBm, $I_j$ expresses signal strength of interfering station j at the location in dBm, adj represents in dB how much a frequency interferers with an adjacent frequency in the technology used by the radio communications system, lt expresses the amount of traffic at the location in Erlangs, and la expresses area of the location in e.g. square kilometers or square miles.

A limitation in this known way of deriving station relationships is that it calculates the carrier-to-interference ratio between a serving station and a single interfering station without consideration of how other interfering stations affect this carrier-to-interference ratio. The problem with this method is that the station relationships do not accurately estimate the negative impact when a serving station and an interfering station are reusing frequencies.

A common problem to all the above-described cell, capacity and frequency planning procedures is that any quality-of-service prediction needed in these procedures require that a frequency plan is known. This is a significant disadvantage, as it is a very time consuming and labor intensive exercise to produce a frequency plan. The problem of evaluation of the expected quality-of-service due to stations configurations in cell planning processes and capacity expansions in capacity planning processes is aggravated by the fact that it is very difficult to find the theoretically optimal frequency plan, which means that this estimation will be dependent on the quality of a frequency plan, which is not only very difficult to find but which also does not guarantee that the quality-of-service of such a plan will represent the best quality-of-service of the network.

SUMMARY OF THE INVENTION

An objective of the present invention is to provide methods that overcome the problems stated above. The objective is wholly or partly accomplished by a method according to the respective independent claims. Embodiments of the invention are set forth in the dependent claims and in the following description.

Thus, according to a first aspect of the invention, there is provided a computer implemented method for modeling a frequency assignment for a radio communications system, comprising a plurality of radio transmitters. The method assigning a frequency to one of said plurality of radio transmitters based on a probability of said radio transmitter being assigned a predetermined frequency.

The term "modeling" means providing a model which may be used in evaluating the radio communications system. A "radio communications system" is primarily intended to mean any cellular telephone system. However, other types of radio communications systems may also be modeled by the method according to the invention. The term "radio transmitter" primarily means radio transmitters which are capable of operating at either a single or plurality of frequencies. The term "assigning frequencies to a radio transmitter" means determining on what frequency/frequencies the radio transmitter is to operate. The predetermined frequency may be any frequency that is available for use by the radio communications system.

The method according to the invention enables the operation of a radio communications system to be simulated and/or evaluated without first having to go through the labor intensive process of assigning a frequency to each radio transmitter in the system. Through the method according to the invention, frequencies are assigned to radio transmitters on a probability basis.

By assigning frequencies to radio transmitters based on a probability distribution it is possible to predict quality-of-service in connection with e.g. cell, capacity and frequency planning procedures, even in circumstances when some of the frequency assignments have not yet been allocated to radio transmitters. A benefit of this is that the radio network can be optimized based on a realistic estimation of the quality-of-service considering the potential frequency reuse in the system.

The method is applicable both in situations where all radio transmitters have been assigned frequencies and where at least one of said plurality of radio transmitters is to be assigned a frequency.

A radio transmitter is "to be assigned a frequency" in any situation where it has not yet been determined on which frequency it is to operate, i.e. when no frequency is pre-assigned to the radio transmitter.

Thus, as opposed to known methods for evaluating a radio communications system, the method according to the invention does not require that all radio transmitters have been pre-assigned frequencies prior to the evaluation, the frequency assignment provided by the invention being a "probabilistic frequency assignment".

According to a second aspect of the invention, there is provided a computer implemented method for modeling frequency usage in a radio communications system comprising a plurality of stations, each station having a plurality of radio transmitters. The method is distinguished in that the frequency usage of at least one of said stations is determined based on a probability of one of said plurality of stations using a predetermined frequency, said probability of said station using said predetermined frequency being determined based on the probabilities of said plurality of radio transmitters in said station being assigned said predetermined frequency.

By adding the frequency assignment probabilities per frequency for all the radio transmitters in a station, a probability (referred to as a "frequency usage probability") may be derived, which indicates the probability that the station will use a particular frequency.

Through the frequency usage probabilities of stations, it is possible to calculate carrier-to-interference ratios per frequency without having to aggregate over all radio transmitters in each station. This provides considerable speed-ups of the calculations in cell, capacity and frequency planning procedures. As with the frequency assignment probabilities the main advantage is that it is possible to make quality-of-service predictions even in circumstances when some of the frequency assignments have not yet been allocated which allows the radio network to be optimized based on a realistic estimation of the quality-of-service considering the potential frequency reuse in the system.

The frequency usage probabilities of a station may be derived so that they reflect the impact of adjacent frequencies and/or transmission probabilities of the radio transmitters in the station as well.

According to a third aspect of the invention, there is provided a computer implemented method for modeling frequency reuse in a radio communications system comprising: a serving station having a plurality of radio transmitters, and an interfering station having a plurality of radio transmitters. The method comprises determining a frequency reuse probability for said serving station and said interfering station based on: probabilities of said plurality of radio transmitters, associated with said serving station being assigned said predetermined frequency, and probabilities of said plurality of radio transmitters, associated with said interfering station being assigned said predetermined frequency.

The frequency reuse probability between a serving station and an interfering station may be used to scale the signal strength of the interfering station when it interferes with the serving station. This enables even faster derivation of quality-of-service predictions in cell, capacity and frequency planning procedures.

The frequency reuse probability between a serving station and an interfering station is derived by summing the products of the frequency usage probabilities of both stations over all frequencies, and then normalizing it by dividing the frequency reuse probability between a serving station and an interfering station with the sum of frequency usage probabilities of the serving station. In one embodiment, the derivation of the frequency reuse probabilities may also consider the impact of interference from adjacent frequencies.

According to a fourth aspect of the present invention, there is provided a computer implemented method for providing a station relationship between a serving station and an interfering station. The method is distinguished that said station relationship is determined based on an expected interference from at least one further interfering station.

Thus, as opposed to prior art determinations of station relationships, the totality of interfering signals may now be considered when determining the station relationship, instead of merely analysing a pair of a serving station and an interfering station. The reuse probabilities, frequency usage probabilites and/or frequency assignment probabilities according to the above described aspects of the invention may be used in determining the station relationship.

Hence, the proposed probabilistic concepts according to the invention, frequency assignment probabilities, frequency usage probabilities and frequency reuse probabilities, enhance the cell, capacity and frequency planning procedures significantly, as they provide a generally applicable approach to calculating expected signal strengths for each station and to predicting quality-of-service at predetermined locations. The main advantage of this approach is that it is also applicable in circumstances when some of the frequency assignments have not been allocated. The proposed probabilistic concepts allow also a more accurate derivation of station relationships than in previously known methods as it is possible to consider the interference from other stations as well in the calculations of these station relationships.

The invention according to its different aspects may be implemented as a computer program product, comprising instructions, which when executed causes a programmable processing device, such as a personal computer, a digital signal processor or any equivalent device to perform any of the methods described above. The invention may be implemented in a radio network planning and optimization tool, such as a computer software, for assisting in e.g. interference analysis, quality-of-service predictions, generation of station relationships, cell planning, capacity planning, frequency planning and frequency spectrum management.

BRIEF DESCRIPTION OF THE FIGURES

The invention will now be described with reference to the enclosed exemplifying figures.

DESCRIPTION OF EMBODIMENTS OF THE INVENTION

Figure 4A:
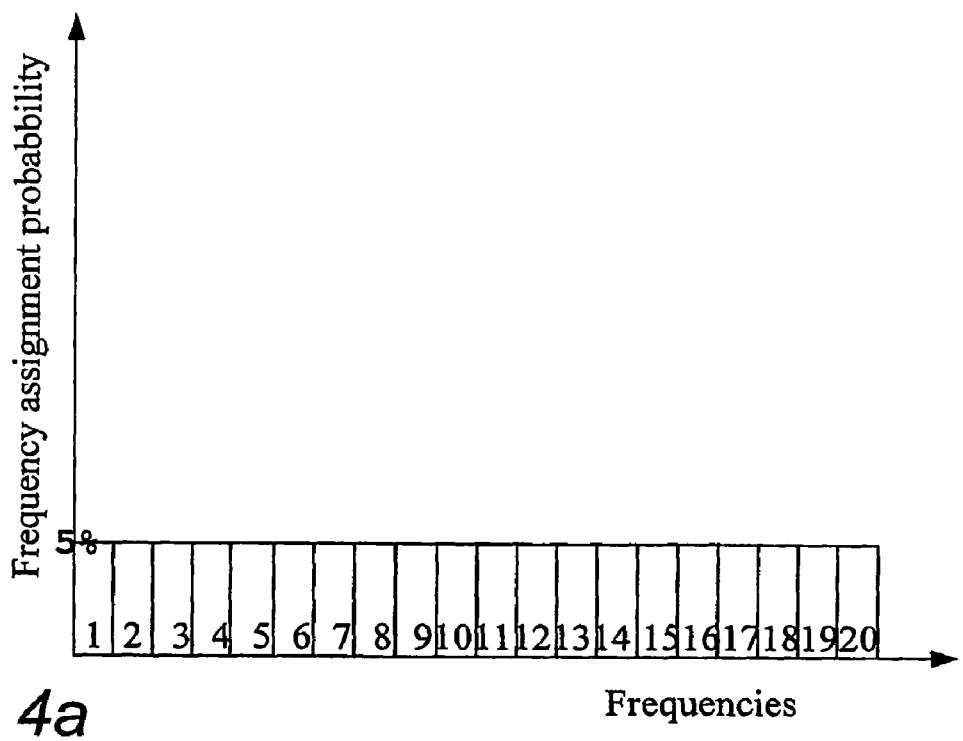
FIGS. 4a and 4b illustrate frequency assignment probabilities of two different radio transmitters.
Figure 4B:
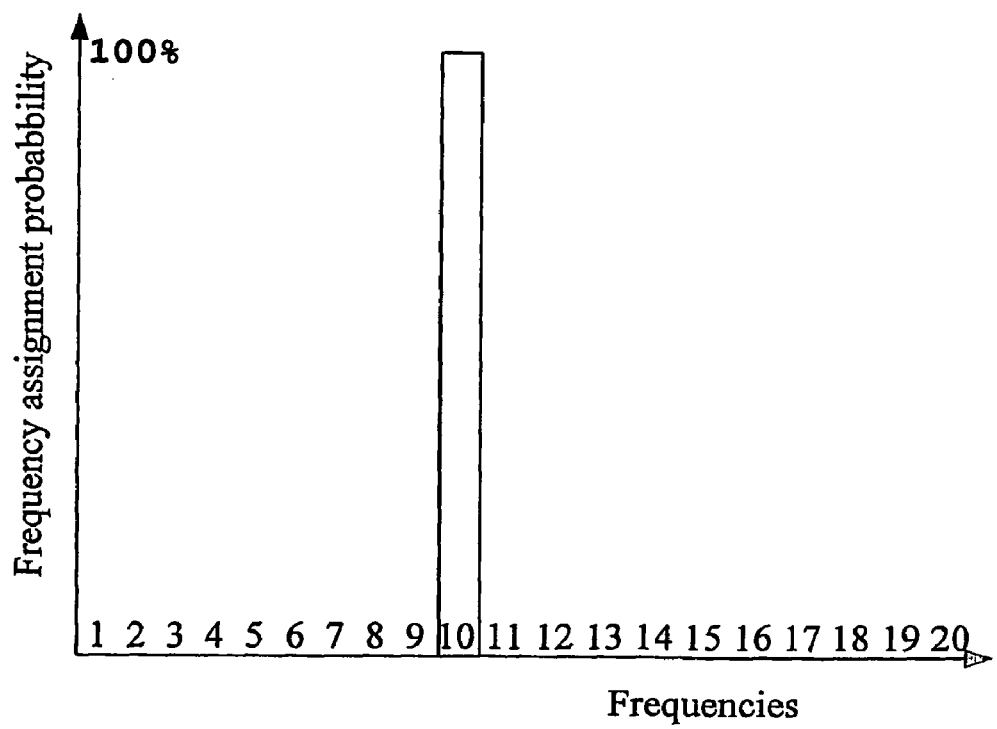

Turning to FIG. 4a-4b, the inventive concept of frequency assignment probability will now be described.

According to the invention, frequencies may, for evaluation purposes, be assigned to radio transmitters, and thus also to stations, based on probabilities, rather than by an operation in which a frequency is manually assigned to each radio transmitter in a station, e.g. by inputting a desired value representing a particular frequency.

A frequency assignment probability $\text{fap}_{mk}$ for a predetermined radio transmitter m and a predetermined frequency k is defined as the probability of that radio transmitter m being assigned the predetermined frequency k.

The invention allows any probability distribution to be used to define frequency assignment probabilities for a radio transmitter over the spectrum of frequencies.

FIG. 4a illustrates frequency assignment probabilities of a first radio transmitter, which may be assigned any one of frequencies 1-20.

As is illustrated in FIG. 4a, a uniform probability distribution may be chosen over the spectrum of available frequencies that the radio transmitter may be assigned to. This implies that the frequency assignment probabilities of a radio transmitter would be either equal to 0 or 1/(Number of available frequencies for this radio transmitter). In a case when the radio transmitter is actually assigned to a single frequency or, in the case of a synthesized hopping radio transmitter, a plurality of frequencies, the number of available frequencies for the radio transmitter reduces consequently to these specific frequencies, and the frequency assignment probabilities for all other frequencies are 0 for this radio transmitter.

FIG. 4b illustrates a frequency assignment probability of a second radio transmitter, which may only be assigned frequency 10.

Another reason that some frequencies may not be available for use by a radio transmitter is to observe a minimum frequency separation requirement from the frequency assignment of other radio transmitters that have already been assigned to frequencies. The sum of frequency assignment probabilities for a radio transmitter over all frequencies in the spectrum is always equal to 1.

By adding the frequency assignment probabilities per frequency for all radio transmitters in a station, it is possible to derive the probability that a station i (i.e. any radio transmitter associated with the station) will use a particular frequency k. These probabilities are referred to as frequency usage probabilities, $\text{fup}_{ik}$.

Figure 5A:
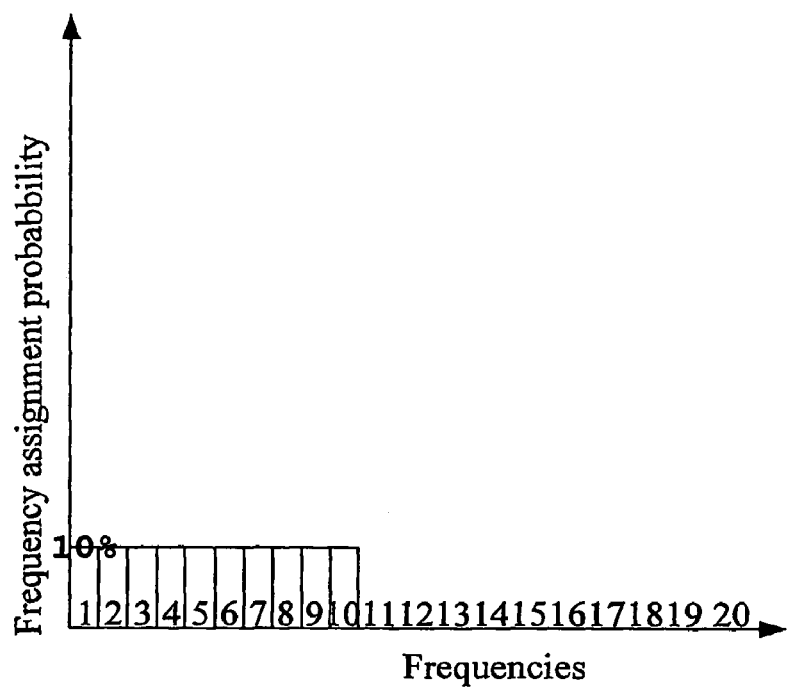
FIGS. 5a-5c illustrate frequency usage probabilities for a station and how it may be derived by adding the frequency assignment probabilities of radio transmitters associated with the station.

FIG. 5a illustrates frequency assignment probabilities of a first radio transmitter, which may be assigned any one of frequencies 1-10.

Figure 5B:
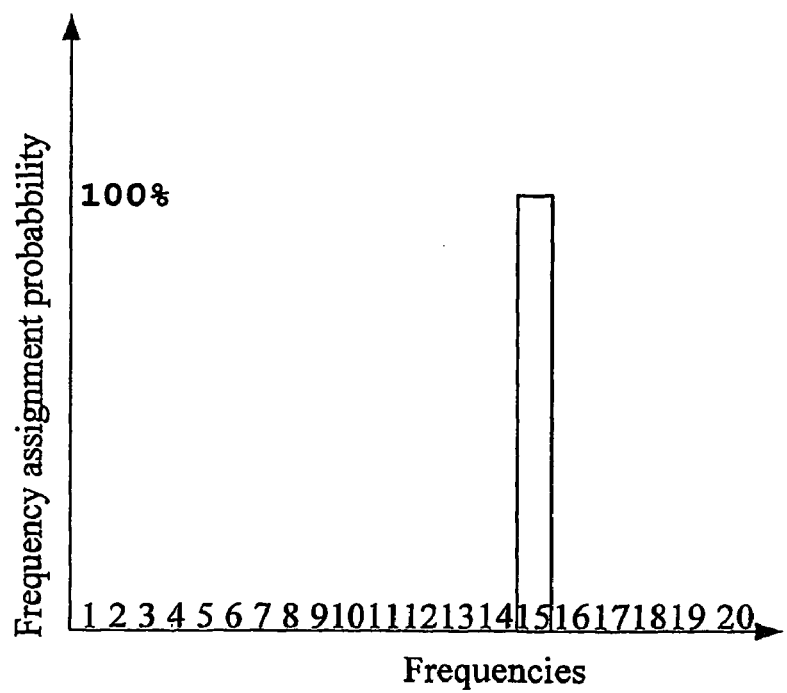

FIG. 5b illustrates frequency assignment probabilities of a second radio transmitter that may be only be assigned frequency 15.

Figure 5C:
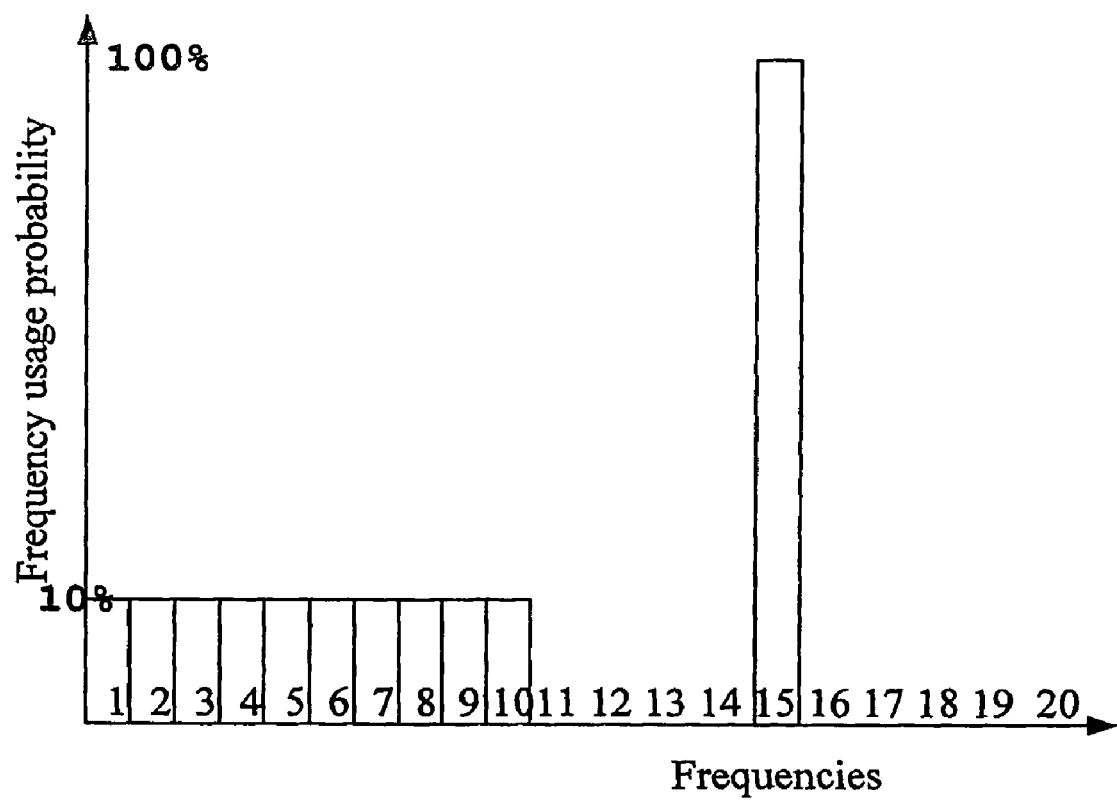

FIG. 5c illustrates frequency usage probabilities of a station comprising of the first and second radio transmitters.

FIG. 5 and the Equation 2 below $$\text{fup}_{ik} = \Sigma_m \text{fap}_{mk} \quad (2),$$

illustrate the frequency usage probabilities of a station and how they may be derived from the frequency assignment probabilities $\text{fap}_{mk}$ of the radio transmitters in the station.

In one embodiment, it is possible to include the impact of adjacent frequencies by modifying Equation 2 above with the frequency assignment probabilities of adjacent frequencies adjusted with a factor, adj, that represents the attenuation from an adjacent frequency, or stated differently, how much a frequency interferes with an adjacent frequency. This factor adj is dependent on the technology of the radio communications system.

$$fup_{ik}=\Sigma_m(fap_{mk}+adj*(fap_{m,k-1}+fap_{m,k-1})) \qquad (3),$$

The frequency usage probabilities $fup_{ik}$ of a station may also consider the probability that a radio is transmitting. This may be done by multiplying the frequency assignment probabilities of the radio transmitter by the transmission probability $tp_m$ of this radio transmitter and then adding these adjusted frequency assignment probabilities per frequency for all the radio transmitters in the station. This is represented in Equation 4 and Equation 5 below. The differences between the two Equations are the consideration of frequency assignment probabilities of adjacent frequencies in Equation 5.

$$fup_{ik}=\Sigma_m(fap_{mk}*tp_m) \qquad (4);$$

$$fup_{ik}=\Sigma_m(fap_{mk}+adj*(fap_{m,k-1}+fap_{m,k-1}))*tp_m) \qquad (5)$$

By means of frequency usage probabilities, it is possible to derive an expected signal strength $eI_{ik}$ for station i at frequency k. This may be expressed by Equation 6:

$$eI_{ik}=I_i*fup_{ik} \qquad (6),$$

wherein:
$eI_{ik}$ is the expected signal strength of station i at frequency k;
$I_i$ is the nominal signal strength from station i;
$fup_{ik}$ is the frequency usage probability of station i at frequency k.

Equation 6 enables a cell planning tool to calculate the expected signal strength for each frequency at a location based only on the nominal signal strength at the said location and the frequency usage probabilities of the station.

Now, the description will focus on how frequency assignment probabilities may be used in cell, capacity and frequency planning procedures, in order to enable carrier-to-interference ratios and quality-of-service predictions to be derived, even in circumstances when some of the frequency assignments have not yet been allocated.

Carrier-to-interference ratios for a carrier frequency k at a location are calculated as expressed in the known Equation 1 above, except that the interfering signals represent the expected interfering signals instead, derived by consideration of the frequency usage probabilities per station in Equation 6 above.

$$CIR_k=C_k/(\Sigma_j(eI_{jk}+adj*(eI_{j,k-1}+eI_{j,k+1}))+N_0) \qquad (7),$$

wherein:
$CIR_k$ is the carrier-to-interference ratio at carrier frequency k;
$C_k$ is the serving signal strength at carrier frequency k;
$\Sigma_j eI_{jk}$ is the sum of all expected signal strengths $eI_{jk}$ from interfering stations j at frequency k.
adj represents how much a frequency interferes with an adjacent frequency; and
$N_0$ is the receiver noise floor.

Figure 1:
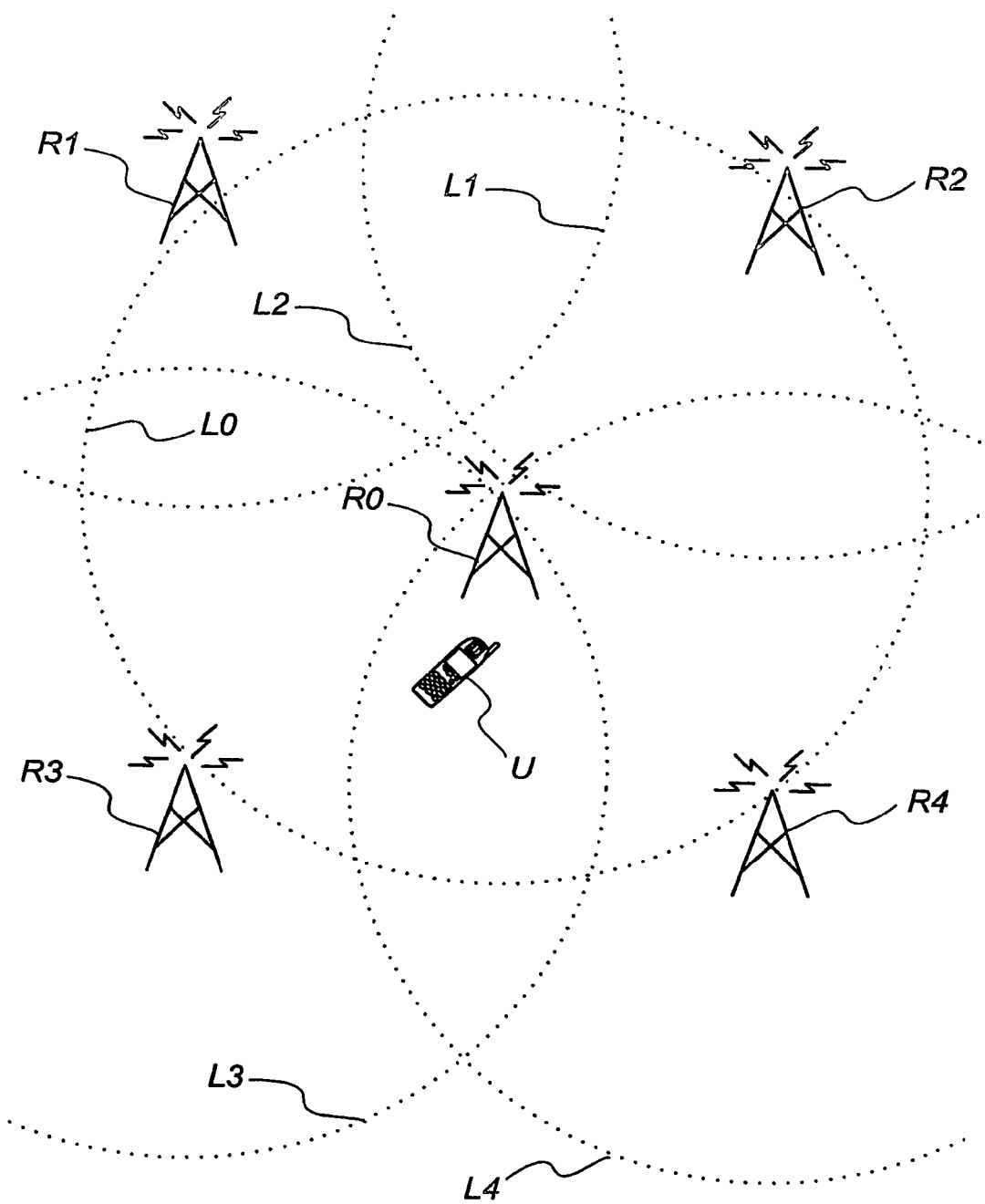
FIG. 1 is a schematic diagram of a radio communications system, in which the invention may be used.
Figure 2:
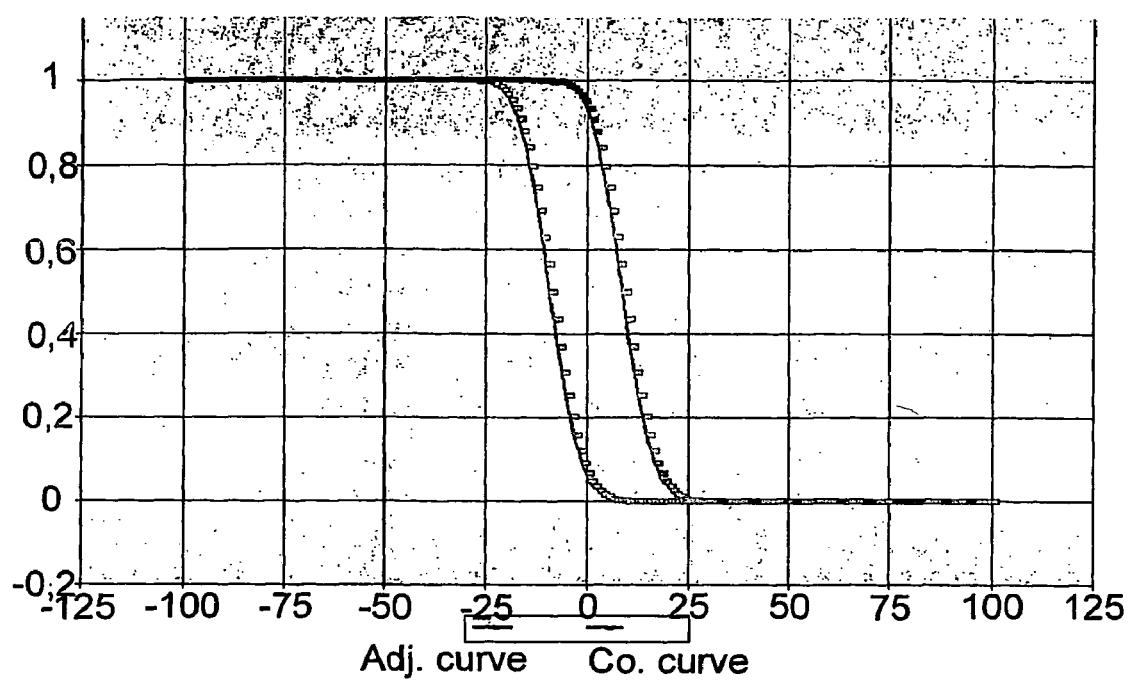
FIG. 2 is a diagram indicating a mapping from carrier-to-interference ratio to probability of interference, with which the invention may be used.

As stated above, carrier-to-interference ratios may also be mapped to a probability of interference with a probability function, ciw. FIG. 2 illustrates such mappings which may be used by the invention. The present invention extends this concept using the expected interference levels derived from frequency usage probabilities.

The expected quality-of-service (QoS) of a radio transmitter m in the serving station i at a predetermined location can be derived by multiplying the frequency assignment probabilities with the probability of interference at each frequency.

$$QoS(m)=\Sigma_k(fap_{mk}*ciw_m(CIR_k)) \qquad (8),$$

In Equation 8, quality-of-service is determined by mapping the carrier-to-interference ratio to a probability of interference, ciw. This mapping has been indexed with m to indicate that radio transmitters may have different mappings to probability of interference. This is due to the fact that radio transmitters may have different carrier-to-interference requirements for delivering an acceptable quality-of-service. The reason of this difference in requirement is that some radio transmitters may benefit from radio communications features used by such radios, which for instance is the case with radio transmitters that use frequency hopping.

Another benefit from this formula is that it is possible to predict the behavior of dynamic system features in radio communications system, such as dynamic power control and adaptive multi-rate vocoders, as their operations are directly dependant on the quality-of-service perceived by a mobile user. The quality-of service estimation expressed in Equation 8 above makes this possible, even in situations when frequencies have not yet been assigned to the radio transmitters.

The expected quality-of-service of a station i at a predetermined location may be derived by averaging over all radio transmitters m in the serving station i. In the described embodiment, the averaging is weighted based on the transmission probability of the radio transmitters in the station.

$$QoS(i)=\Sigma_m(tp_m*QoS(m))/\Sigma_m tp_m \qquad (9),$$

It would be possible to consider other weightings for this averaging as well, e.g. based on a relative importance of the radio transmitters in a station.

As the present invention allows quality-of-service predictions to be made even if some frequencies are not yet assigned, it is now possible to predict the quality-of-service after a capacity expansion, without first having to assign frequencies, which thereby offers considerable time savings to radio network operators.

Now, the description will focus on frequency reuse probabilities which is another aspect of the invention. Frequency reuse probabilities may be used to derive quality-of-service predictions faster.

Equation 8 suggests that the integration should be made over all frequencies used by the radio communications system at each location. The time it takes to calculate a quality-of-service prediction is therefore proportional to the number of frequencies used in the radio communications system. According to this aspect of the invention, an approach that provides a close approximation of this calculation is possible by first determining frequency reuse probabilities between each pair of serving station and interfering station, and thereafter using these frequency reuse probabilities to scale the interfering signal strengths at each location.

A frequency reuse probability $frp_{ij}$ between a serving station i and an interfering station j may be derived by integrating the product of frequency usage probabilities $fup_{ik}$, $fup_{jk}$ for both stations over all frequencies used by the radio communications system and normalizing by the sum of frequency usage probabilities over all frequencies of the serving station.

$$frp_{ij}=\Sigma_k(fup_{ik}*fup_{jk})/\Sigma_k fup_{ik} \qquad (10),$$

wherein:

$\text{frp}_{ij}$ is the frequency reuse probability between a serving station i and an interfering station j;

$\text{fup}_{ik}$ is the frequency usage probability for station i at frequency k derived in Equations 2, 3, 4, or 5 above via the frequency assignment probability for the radio transmitters in the station; and $\text{fup}_{jk}$ is the frequency usage probability for station j at frequency k derived in Equations 2, 3, 4, or 5 above via the frequency assignment probability for the radio transmitters in the station.

Figure 6A:
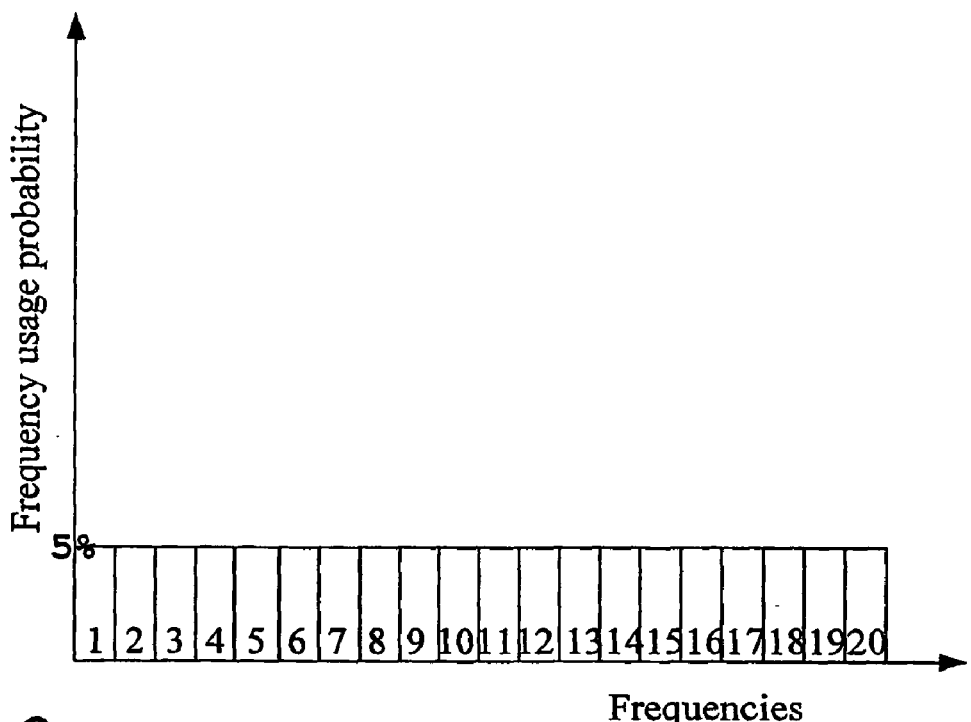
FIG. 6 illustrates the frequency reuse probabilities between a serving station and an interfering station and how they may be derived from the frequency usage probabilities of the two stations.
Figure 6B:
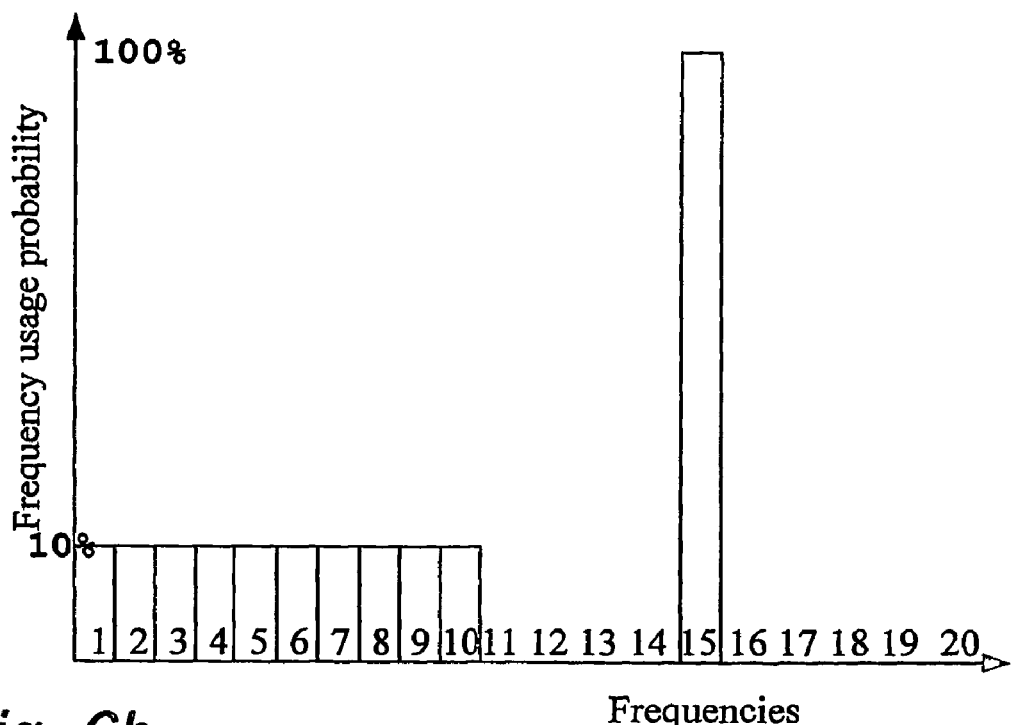

FIG. 6 illustrates the frequency reuse probabilities between a serving station and an interfering station and how they may be derived via the frequency usage probabilities of the two stations. FIG. 6a provides a schematic illustration of frequency usage probabilities of a serving station i. FIG. 6b provides a schematic illustration of frequency usage probabilities of an interfering station j.

Inserting the frequency usage probabilities of the stations in FIG. 6a and FIG. 6b in equation 10 makes the frequency reuse probability between the serving station and the interfering station equal to 0.10. This is derived by summing the product of the frequency usage probabilities in the two stations over all frequencies: at frequencies 1-10, this is equal to 0.05*0.10, at frequency 11-14 and 16-20, this is equal to 0.05*0.00 and at frequency 15 this is equal to 0.05*1.00. This is then normalized by dividing with the sum of the frequency usage probabilities over all frequencies in the serving station, which is equal to 1.00 in this example.

The frequency reuse probabilities may consider interference from adjacent frequencies, either directly with Equation 10 if the frequency usage probabilities are derived by Equations 3 or 5 above as they consider adjacent frequencies, or alternatively, by the formula below, using the frequency usage probabilities from Equation 2 or 4.

$$\text{frp}_{ij}=\Sigma_k(\text{fup}_{ik}*(\text{fup}_{jk}+\text{adj}*(\text{fup}_{j,k-1}+\text{fup}_{j,k+1})))/\Sigma_k\text{fup}_{ik} \quad (11),$$

By means of frequency reuse probabilities, it is possible to derive an expected signal strength $eI_j$ for station j when it is interfering with station i. This may be expressed by the following formula:

$$eI_j=\text{frp}_{ij}*I_j \quad (12),$$

wherein:

$eI_j$ is the expected signal strength of station j when interfering with station i;

$I_j$ is the nominal signal strength from station j; and $\text{frp}_{ij}$ is the frequency reuse probability between serving station i and interfering station j.

Equation 12 enables a cell planning tool to calculate the expected signal strength for each interfering station j when interfering with a serving station i, based only on the nominal signal strength of each interfering station j at this location and the frequency reuse probability between the serving station i and the interfering station j.

Using the expected signal strength from Equation 12, it is possible to calculate the carrier-to-interference ratio at a location served by station i. Note that this carrier-to-interference ratio is derived for a station i and not for a particular frequency.

$$CIR_i=C_i/(\Sigma_j(eI_j)+N_0) \quad (13),$$

wherein $CIR_i$ is the carrier to interference ratio for serving station i at the location;

$C_i$ is the signal strength of serving station i at the location; and $\Sigma_j(eI_j)$ is the expected interference at the location derived as the sum of products over all interfering stations j of the frequency reuse probabilities $\text{frp}_{ij}$ and the interfering signal $I_j$ from interfering station j.

As stated earlier, the carrier-to-interference ratios may also be mapped to a probability of interference by using a probability function, ciw. The present invention extends this concept using expected interference levels derived from frequency usage probabilities.

As the present invention allows quality-of-service predictions to be made even if some frequencies are not yet assigned, it is also possible, with the method using frequency reuse probabilities, to predict the quality-of-service after a capacity expansion, without first assigning frequencies, thereby offering considerable time savings to a radio network operator.

Station relationships between a serving station and an interfering station are used in frequency planning procedures as they indicate the importance of avoiding reuse of frequencies between any pair of two stations. They are derived by aggregating the probabilities of interference, over all locations served by the serving station, derived from signal strength comparisons between the serving station and the interfering station, assuming that they are either reusing the same frequency or operating at adjacent frequencies. A known approach to derive station relationships was outlined above with reference to FIG. 3, which compared signal strengths of the serving station and a single interfering station without consideration for other possible interfering stations.

Conversely, the present invention allows the signal strengths comparisons to be derived considering an expected level of interference from other interfering stations. An improved method for calculating station relationships will now be described with reference to FIG. 7.

In Step S20, the traffic ($\text{tic}_{ij}$, $\text{tia}_{ij}$) and area ($\text{aic}_{ij}$, $\text{aia}_{ij}$) accumulators are initially set to zero. These accumulators identify the additional amount of traffic/area that would be interfered if a serving station i and an interfering station j reuse either the same or adjacent frequencies.

In step S21, a location is selected for evaluatttion.

Step S22 constitutes a sub-step of step S21, which comprises identifying and evaluating a serving station i at this location, with the probability of serving at this location equal to $sp_i$.

Step S23 is a sub-step of step S22, and comprises evaluating each station j which interferes with station i at this location.

In step S24, the total expected interference is calculated by summing the expected interference from all interfering stations plus noise, $\Sigma_n(eI_n)+N_0$, for two distinct cases: serving station i is reusing frequencies with station j, eI_j, and serving station i is not reusing frequencies with station j, eI_no_j.

In step S25, it is calculated how much the probability of interference will increase at the location due to reuse with station j on the same frequency, lpc:

$$lpc=sp_i*(ciw(C_i/eI\_j)-ciw(C_i/eI\_no\_j)).$$

In step S26, calculate how much the probability of interference will increase at the location due to reuse with station j on the adjacent frequency, lpa:

$$lpa=sp_i*(ciw(C_i/eI\_j-adj)-ciw(C_i/eI\_no\_j-adj)).$$

In step S27, the additional amount of traffic that would be interfered at this location if serving station i and interfering station j reused on the same frequency $\text{tic}_{ij}$ and on adjacent frequencies $\text{tia}_{ij}$ is added to the traffic accumulators:

$$\text{tic}_{ij}=\text{tic}_{ij}+lpc*lt; \ \text{tia}_{ij}=\text{tia}_{ij}+lpa*lt.$$

In step S28, the additional amount of area that would be interfered at this location if serving station i and interfering station j reused on the same frequency $aic_{ij}$ and on adjacent frequencies $aia_{ij}$ is added to the area accumulators:

$$aic_{ij}=aic_{ij}+lpc*la; \; aia_{ij}=aia_{ij}+lpa*la.$$

In step S29, the flow returns to step S23 in case there are more interfering stations at the present location.

In step S30, the flow returns to step S22 in case there are more serving stations at the present location.

In step S31, the flow returns to step S21 in case there are more locations to evaluate.

In step S32, the flow terminates, with the traffic ($tic_{ij}$, $tia_{ij}$) and area ($aic_{ij}$, $aia_{ij}$) accumulators as the derived result between all combinations of a serving station i and an interfering stations j.

In the above described algorithm, the following abbreviations are used:

$tic_{ij}$ designates the additional amount of traffic, expressed in Erlangs, that would be interfered if station i reuse with station j on the same frequency, $tia_{ij}$ designates the additional amount of traffic, expressed in Erlangs, that would be interfered if station i reuse with station j on adjacent frequencies, $aic_{ij}$ designates the additional amount of area, expressed in e.g. square kilometers or square miles, that would be interfered if station i reuse with station j on the same frequency, $aia_{ij}$ designates the additional amount of area, expressed in square kilometers or square miles, that would be interfered if station i reuse with station j on adjacent frequencies, $eI_n$ is the expected interference in dBm to serving station i at the location from interfering station n; which may be derived according to Equation 12, $eI_n=frp_{in}*I_n$, $eI\_j$ is the total expected interference in dBm to serving station i at the location, assuming reuse with station j, derived by summing the interference from station j plus the expected interference from all other stations, $eI\_j=I_j+\Sigma_{n\neq j}(eI_n)+N_0$ $eI\_no\_j$ is the total expected interference in dBm to serving station i at the location, assuming no reuse with station j, derived by summing the expected interference from all interfering stations except station j, $eI\_no\_j=\Sigma_{n\neq j}(eI_n)+N_0$ $C_i$ expresses the signal strength of serving station i at the location in dBm, $I_j$ expresses signal strength of interfering station j at the location in dBm, adj represents in dB how much a frequency interferes with an adjacent frequency in this technology, lt expresses traffic at the location, and la expresses area of the location.

Figure 3:
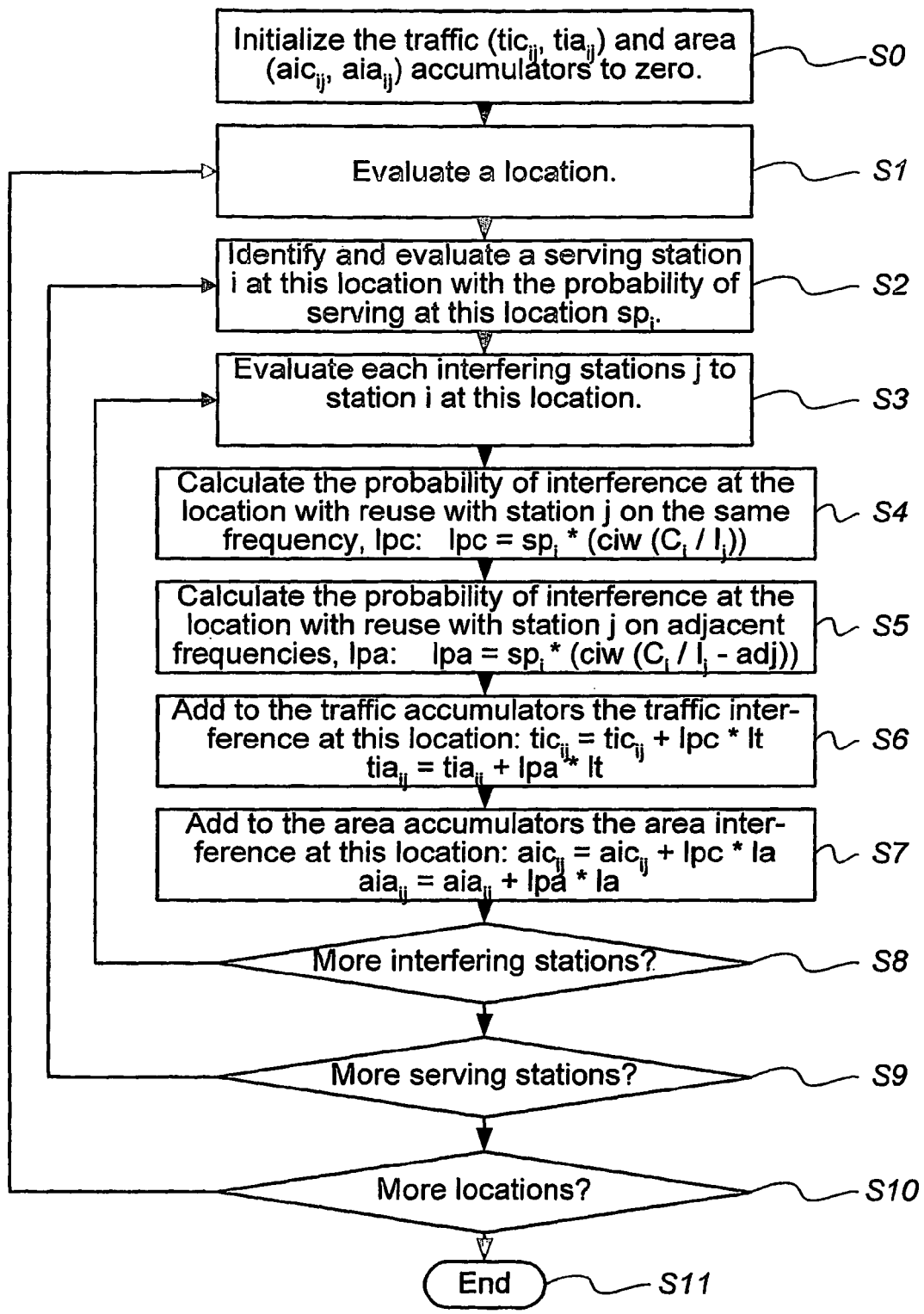
FIG. 3 is a flow chart illustrating a known algorithm for calculating station relationships.

This improved method of deriving station relationships enhances the known method outlined with reference to FIG. 3 in that it will more accurately derive the importance of avoiding reuse of frequencies as the calculation derive the additional amount of interference that will occur if two stations reuse frequencies and hence better expressing the relative importance of not reusing frequencies in these two stations.

Figure 7:
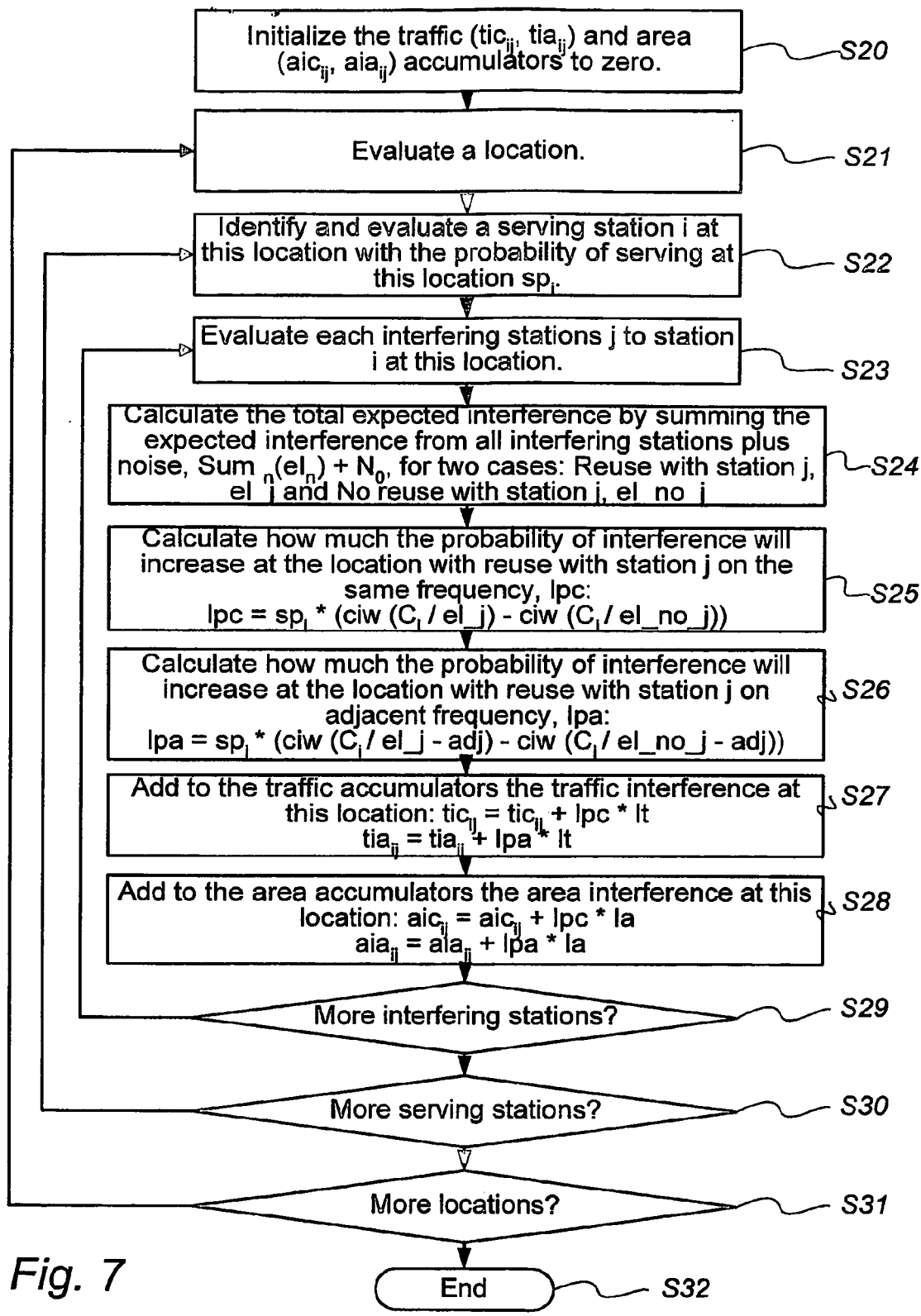
FIG. 7 is a description of a new algorithm for calculating station relationships using frequency reuse probabilities.

It should be noted that the algorithm outlined in FIG. 7 is shown in an illustrative format. In practice, the person skilled in the art will realize that a vast amount of modifications may be made within the scope of the appended claims, and that the steps of the methods do not necessarily need to be performed as separate steps, or in the described order.

Thus, the present invention enhances also the known method of determining station relationships, which describe how communications in a serving station are interfered if another interfering station reuses either the same or adjacent frequencies as the serving station, by better qualifying and quantifying the relative importance that a serving station and an interfering station should not reuse frequencies. These station relationships are used in frequency planning procedures to effectively utilize the frequencies available for communications.

Furthermore, as an example, a computer implemented method for modeling a frequency assignment in a radio communication system comprising a plurality of radio transmitters, may comprise the step of providing a data record representing one of said plurality of radio transmitters with a representation of a radio frequency. The method may be distinguished in that the step of providing said data record with said frequency comprises assigning said frequency based on a probability of said radio transmitter being assigned said frequency.

I claim:

1. A computer implemented method for modelling a frequency assignment for a radio communications system having a plurality of radio transmitters, the method comprising assigning a predetermined frequency to one of said plurality of radio transmitters based on a probability of said radio transmitter being assigned the predetermined frequency, wherein said predetermined frequency is included in a set of a plurality of frequencies available for use by the radio communications system, and wherein said probability of said radio transmitter being assigned the predetermined frequency is uniformly distributed over all frequencies available to the radio transmitter.

2. The method as claimed in claim 1, wherein at least one of said plurality of radio transmitters is to be assigned said predetermined frequency.

3. The method as claimed in claim 1, wherein the radio communications system comprises a plurality of stations, each station being associated with at least one of said plurality of radio transmitters.

4. A computer implemented method for modelling frequency usage in a radio communications system having a plurality of stations, each station being with a plurality of radio transmitters, wherein the frequency usage of at least one of said stations is determined based on a probability of one of said plurality of stations using a predetermined frequency, wherein said predetermined frequency is included in a set of a plurality of frequencies available for use by the radio communications system, said probability of said one of said plurality of stations using said predetermined frequency being determined based on probabilities of said plurality of radio transmitters in said station being assigned said predetermined frequency, wherein said probabilities of said radio transmitters being assigned the predetermined frequency are uniformly distributed over all frequencies available to the radio transmitters.

5. The method as claimed in claim 4, wherein said probability of said station using said predetermined frequency is determined based on a sum of probabilities of the radio transmitters associated with said station being assigned said predetermined frequency.

6. The method as claimed in claim 4, wherein said probability of said station using said predetermined frequency is determined based on probabilities of one of said plurality of radio transmitters being assigned frequencies adjacent said predetermined frequency.

7. The method as claimed in of claims 4, wherein said probability of said station using said predetermined frequency is determined based on a transmission probability of one of said plurality of radio transmitters operating.

8. A computer implemented method for determining an expected signal strength of a station at a predetermined location and at a predetermined frequency in a radio communications system, wherein said expected signal strength is determined based on a probability of said station using said predetermined frequency, wherein said predetermined frequency is included in a set of a plurality of frequencies available for use by the radio communications system, said probability of said station using said predetermined frequency being determined based on the probabilities of said plurality of radio transmitters in said station being assigned said predetermined frequency wherein said probabilities of said radio transmitters being assigned the predetermined, frequency are uniformly distributed over all frequencies available to the radio transmitters.

9. A computer implemented method for determining a carrier-to-interference ratio at a predetermined frequency and a predetermined location in a radio communications system, wherein said predetermined frequency is included in a set of a plurality of frequencies available for use by the radio communications system, wherein an expected signal strength of an interfering station is determined based on a probability of said station using said predetermined frequency, said probability of said station using said predetermined frequency being determined based on the probabilities of said plurality of radio transmitters in said station being assigned said predetermined frequency, wherein said probabilities of said radio transmitters being assigned the predetermined frequency are uniformly distributed over all frequencies available to the radio transmitters.

10. A computer implemented method for modelling frequency reuse in a radio communications system comprising: a serving station having a plurality of radio transmitters, and an interfering station having a plurality of radio transmitters, the method comprising determining a frequency reuse probability for said serving station and said interfering station based on:
  probabilities of said plurality of radio transmitters, associated with said serving station being assigned a predetermined frequency, and
  probabilities of said plurality of radio transmitters, associated with said interfering station being assigned said predetermined frequency, wherein said predetermined frequency is included in a set of a plurality of frequencies available for use by the radio communications system, and wherein said probabilities of said transmitters being assigned the predetermined frequency are uniformly distributed over all frequencies available to the radio transmitters.

11. The method as claimed in claim 10, wherein said frequency reuse probability is determined according to the formula:

$$frp_{ij}=\Sigma_k(fup_{ik}*fup_{jk})/\Sigma_k fup_{ik}$$

wherein:
  $frp_{ij}$ is the frequency reuse probability between said serving station (i) and said interfering station (j);
  $fup_{ik}$ is the probability of said serving station (i) using said predetermined frequency (k), said probability being determined based on the probabilities of said plurality of radio transmitters associated with said serving station (i) being assigned said predetermined frequency (k); and
  $fup_{jk}$ is the probability of said interfering station (j) using said predetermined frequency (k), said probability being determined based on the probabilities of said plurality of radio transmitters associated with said interfering station (i) being assigned said predetermined frequency (k).

12. The method as claimed in claim 11, wherein said serving station is associated with a plurality of radio transmitters, whereby said frequency reuse probability is determined based on probabilities of said plurality of radio transmitters, associated with said serving station, being assigned frequencies adjacent said predetermined frequency.

13. The method as claimed in claim 11, wherein said interfering station comprises a plurality of radio transmitters, whereby said frequency reuse probability is determined based on probabilities of said plurality of radio transmitters, associated with said interfering station being assigned frequencies adjacent said predetermined frequency.

14. The method as claimed in claim 12, wherein said frequency reuse probability is determined according to the formula:

$$frp_{ij}=\Sigma_k(fup_{ik}*(fup_{jk}+adj*(fup_{j,k-1}+fup_{j,k+1})))/\Sigma_k fup_{ik}$$

wherein:
  $frp_{ij}$ is the frequency reuse probability between said serving station (i) and said interfering station (j);
  $fup_{ik}$ is the probability of said serving station (i) using said predetermined frequency (k);
  $fup_{jk}$ is the probability of said interfering station (j) using said predetermined frequency (k);
  $fup_{j,k+1}$ is the probability of said interfering station (j) using an adjacent frequency ; and
  adj represents in dB how much a frequency interferes with an adjacent frequency in the radio communications system.

15. A computer implemented method for determining an expected signal strength, at a predetermined location, of an interfering station interfering with a serving station in a radio communications system, wherein said expected signal strength is determined based on a frequency reuse probability, said frequency reuse probability being determined by probabilities of said plurality of radio transmitters, associated with said serving station, being assigned a predetermined frequency, and probabilities of said plurality of radio transmitters, associated with said interfering station, being assigned said predetermined frequency, wherein said predetermined frequency is included in a set of a plurality of frequencies available for use by the radio communications system, and wherein said probabilities of said radio transmitters being assigned said predetermined frequency are uniformly distributed over all frequencies available to the radio transmitters.

16. A computer implemented method for determining a carrier-to-interference ratio in a radio communications system, wherein that an expected signal strength ($el_j$) of one interfering station is determined based on a frequency reuse probability, said frequency reuse probability being determined by probabilities of said plurality of radio transmitters, associated with said serving station, being assigned a predetermined frequency, and probabilities of said plurality of radio transmitters, associated with said interfering station, being assigned said predetermined frequency, wherein said predetermined frequency is included in a set of a plurality of frequencies available for use by the radio communications system, and wherein said probabilities of said radio transmitters being assigned said predetermined frequency are uniformly distributed over all frequencies available to the radio transmitters.

17. A computer implemented method for determining a radio transmitter power level, wherein said radio transmitter power level is determined based an expected signal strength, which is determined based on a frequency reuse probability, said frequency reuse probability being determined by probabilities of said plurality of radio transmitters, associated with said serving station, being assigned a predetermined frequency, and probabilities of said plurality of radio transmitters, associated with said interfering station, being assigned said predetermined frequency, wherein said predetermined frequency is included in a set of a plurality of frequencies available for use by the radio transmitters, and wherein said probabilities of said radio transmitters being assigned said predetermined frequency are uniformly distributed over all frequencies available to the radio transmitters.

18. A computer implemented method for determining a radio transmitter adaptive multirate vocoder rate, wherein said radio transmitter vocoder rate is determined based on an expected signal strength, which is determined based on a frequency reuse probability, said frequency reuse probability being determined by probabilities of said plurality of radio transmitters, associated with said serving station, being assigned said predetermined frequency, and probabilities of said plurality of radio transmitters, associated with said interfering station, being assigned said predetermined frequency, wherein said predetermined frequency is included in a set of a plurality of frequencies available for use by the radio transmitters, and wherein said probabilities of said radio transmitters being assigned said predetermined frequency are uniformly distributed over all frequencies available to the radio transmitter.

19. A computer implemented method for determining a quality-of-service of a radio transmitter in a radio communications system, wherein said quality-of-service is determined based on a probability of said radio transmitter being assigned a predetermined frequency, wherein said predetermined frequency is included in a set of a plurality of frequencies available for use by the radio communications system and wherein said probability of said radio transmitter being assigned said predetermined frequency is uniformly distributed over all frequencies available to the radio transmitter.

20. The method as claimed in claim 19, wherein said quality-of-service is determined based on a carrier-to-interference ratio of said predetermined frequency.

21. The method as claimed in claim 20 wherein said quality-of-service is determined based on a sum of products of said probability ($fap_{mk}$) and said carrier-to interference ratio ($CIR_k$).

22. The method as claimed in claim 19, wherein said quality-of-service is determined based on a weight function, said weight function being specific to said radio transmitter.

23. A computer implemented method for determining a quality-of-service of a station in a radio communications system, the method comprising determining said quality-of-service based on an average quality-of-service of a plurality of radio transmitters associated with said station, said quality-of-service of one of said plurality of radio transmitters being determined based on a probability of said radio transmitter being assigned a predetermined frequency, wherein said predetermined frequency is included in a set of a plurality of frequencies available for use by the radio communications system and wherein said probability of said radio transmitter being assigned said predetermined frequency is uniformly distributed over all frequencies available to the radio transmitter.

24. The method as claimed in claim 23, the method comprising determining the quality-of-service of the station according to the formula:

$$QoS(i)=\Sigma_m(tp_m*QoS(m))/\Sigma_m tp_m,$$

wherein:
 $tp_m$ is the transmission probability of the radio transmitter (m) in station (i);
 QoS (m) is the quality-of-service of the radio transmitter (m) in station (i); and
 QoS (i) is the quality-of-service of the station (i).

25. A computer implemented method for providing a station relationship between a serving station and an interfering station, the method comprising: determining a frequency reuse probability for said serving station and said interfering station based on:
 probabilities of a plurality of radio transmitters, associated with said serving station, being assigned a predetermined frequency, and
 probabilities of said plurality of radio transmitters, associated with said interfering station, being assigned said predetermined frequency, wherein the predetermined frequency is included in a set of a plurality of frequencies available for use by the radio transmitters, and wherein said probabilities of said radio transmitters being assigned the predetermined frequency are uniformly distributed over all frequencies available to the radio transmitters.

26. A computer implemented method for providing a station relationship between a serving station and an interfering station, wherein said station relationship is determined based on an expected interference from at least one further interfering station, said expected interference based on a probability of a radio transmitter, associated with said interfering station, being assigned a predetermined frequency, wherein the predetermined frequency is included in a set of a plurality of frequencies available for use by the radio transmitter and wherein said probability of said radio transmitter being assigned the predetermined frequency is uniformly distributed over all frequencies available to the radio transmitter.

27. A computer implemented method for one or more of cell planning, frequency planning and capacity planning in a radio communications system, the method comprising assigning a predetermined frequency to one of a plurality of radio transmitters based on a probability of a radio transmitter being assigned the predetermined frequency, wherein the predetermined frequency is included in a set of a plurality of frequencies available for use by the radio communications system, and wherein said probability of said radio transmitter being assigned the predetermined frequency is uniformly distributed over all frequencies available to the radio transmitter.

28. A computer implemented method for one or more of cell planning, frequency planning and capacity planning in a radio communications system, the method comprising determining the frequency usage of at least one of a plurality stations in the communication system is determined based on a probability of one of said plurality of stations using a predetermined frequency, determining said probability of said station using said predetermined frequency based on the probabilities of said plurality of radio transmitters in said station being assigned said predetermined frequency, wherein said predetermined frequency is included in a set of a plurality of frequencies available for use by the radio communications system, and wherein said probabilities of said radio transmitters being assigned said predetermined frequency are uniformly distributed over all frequencies available to the radio transmitters.

29. A computer implemented method for one or more of cell planning, frequency planning and capacity planning in a radio communications system, the method comprising determining a frequency reuse probability for a serving station of the radio communications system and a interfering station of the radio communications system based on:
 probabilities of a plurality of radio transmitters, associated with said serving station, being assigned a predetermined frequency, and probabilities of a plurality of radio transmitters, associated with said interfering station, being assigned said predetermined frequency, wherein said predetermined frequency is included in a set of a plurality of frequencies wherein available for use by the radio communications system, and wherein said probabilities of said radio transmitters being assigned said predetermined frequency are uniformly distributed over all frequencies available to the radio transmitters.

30. A computer implemented method for one or more of cell planning, frequency planning and capacity planning in a radio communications system, the method comprising steps according to claim 19.

31. A computer implemented method for one or more of cell planning, frequency planning and capacity planning in a radio communications system, the method comprising steps according to claim 23.

32. A computer implemented method for one or more of cell planning, frequency planning and capacity planning in a radio communications system, the method comprising steps according to claim 26.

33. A computer program product for one or more of cell planning, frequency planning and capacity planning in a radio communications system, said computer program product comprising instructions, which when executed causes a programmable processing device to perform the method as claimed in claim 1.

34. A computer program product for one or more of cell planning, frequency planning and capacity planning in a radio communications system, said computer program product comprising instructions, which when executed causes a programmable processing device to perform the method as claimed in claim 4.

35. A computer program product for one or more of cell planning, frequency planning and capacity planning in a radio communications system, said computer program product comprising instructions, which when executed causes a programmable processing device to perform the method as claimed in claim 10.

36. A computer program product for one or more of cell planning, frequency planning and capacity planning in a radio communications system, said computer program product comprising instructions, which when executed causes a programmable processing device to perform the method as claimed in claim 19.

37. A computer program product for one or more of cell planning, frequency planning and capacity planning in a radio communications system, said computer program product comprising instructions, which when executed causes a programmable processing device to perform the method as claimed in claim 23.

38. computer program product for one or more of cell planning, frequency planning and capacity planning in a radio communications system, said computer program product comprising instructions, which when executed causes a programmable processing device to perform the method as claimed in claim 26.

39. computer program product for one or more of cell planning, frequency planning and capacity planning in a radio communications system, said computer program product comprising instructions, which when executed causes a programmable processing device to perform the method as claimed in claim 25.

* * * * *

UNITED STATES PATENT AND TRADEMARK OFFICE
CERTIFICATE OF CORRECTION

PATENT NO.         : 7,653,395 B2                                         Page 1 of 1
APPLICATION NO. : 11/258585
DATED              : January 26, 2010
INVENTOR(S)        : Joachim Samuelsson It is certified that error appears in the above-identified patent and that said Letters Patent is hereby corrected as shown below:

In column 1, line 13, delete "apart" and insert -- a part --, therefor.

In column 14, line 62, in Claim 7, delete "of claims 4," and insert -- claim 4, --, therefor.

In column 15, line 10, in Claim 8, after "frequency" insert -- , --.

In column 15, line 11, in Claim 8, delete "predetermined," and insert -- predetermined --, therefor.

In column 16, line 24, in Claim 14, delete "frequency ;" and insert -- frequency; --, therefor.

In column 16, line 62, in Claim 17, after "based" insert -- on --.

In column 17, line 38, in Claim 21, delete "carrier-to interference" and insert -- carrier-to-interference --, therefor.

In column 20, line 19, in Claim 38, before "computer" insert -- A --.

In column 20, line 26, in Claim 39, before "computer" insert -- A --.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,653,395 B2  Page 1 of 1
APPLICATION NO. : 11/258585
DATED : January 26, 2010
INVENTOR(S) : Joachim Samuelsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Twenty-eighth Day of December, 2010

David J. Kappos
*Director of the United States Patent and Trademark Office*